F. L. CROSS.
MEANS FOR CONTROLLING FLOW THROUGH CONDUITS OR MAINS.
APPLICATION FILED FEB. 21, 1910.

1,021,762.

Patented Apr. 2, 1912.

Witnesses
A. M. Shannon.
B. E. McGrann.

Inventor
FRANK L. CROSS

By
Bartlett & Bartlett
Attorneys

UNITED STATES PATENT OFFICE.

FRANK L. CROSS, OF DETROIT, MICHIGAN.

MEANS FOR CONTROLLING FLOW THROUGH CONDUITS OR MAINS.

1,021,762.  Specification of Letters Patent.  Patented Apr. 2, 1912.

Application filed February 21, 1910. Serial No. 545,023.

*To all whom it may concern:*

Be it known that I, FRANK L. CROSS, a citizen of the United States of America, residing at Detroit, in the county of Wayne and State of Michigan, have invented certain new and useful Improvements in Means for Controlling Flow Through Conduits or Mains, of which the following is a specification, reference being had therein to the accompanying drawings.

This invention relates to means for controlling flow of fluid through a conduit or main to maintain predetermined pressure at a given point in the main.

The apparatus herein described is an adaptation in a measure of the fluid regulating apparatus disclosed and claimed in my co-pending application filed Feb. 6, 1909, Serial No. 476,338 for pressure regulators for gas system, wherein means are shown for automatically maintaining a uniform head in a gas main that include an automatic governor for setting up a drop in the main, and means operated by the resulting pressures for controlling the governor.

The invention consists in the matters hereinafter set forth, and more particularly pointed out in the appended claims.

Figure 1:
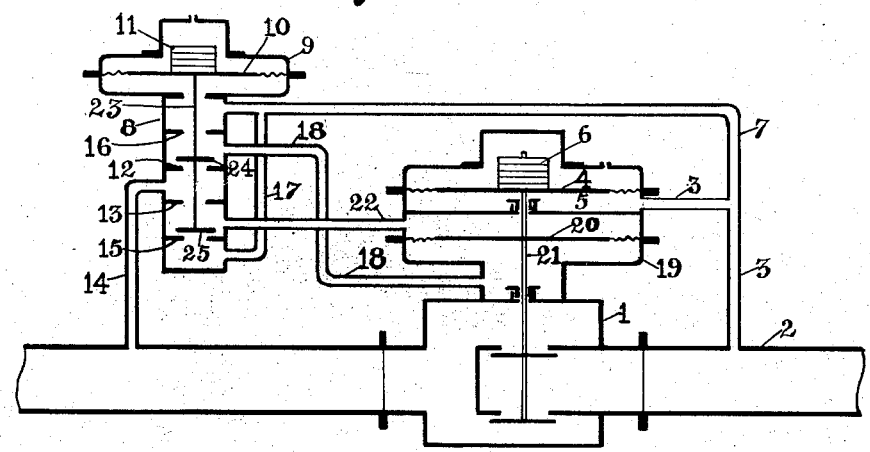
Figure 2:
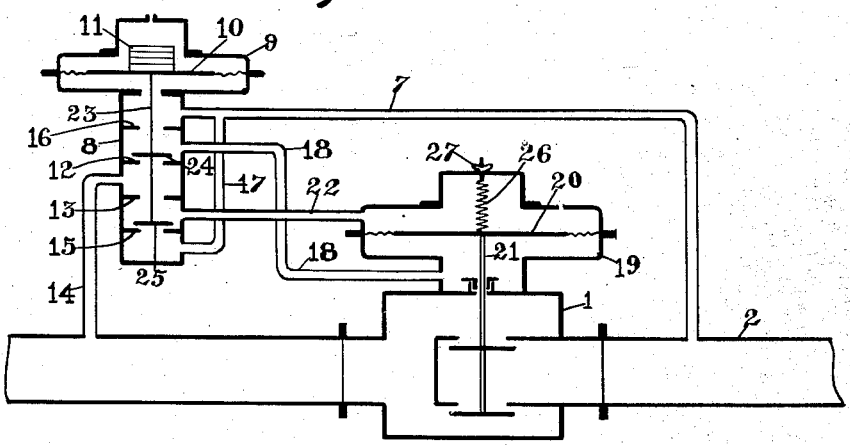

In the drawings, Figure 1 is a diagrammatic view of a preferred form of apparatus which embodies features of the invention; and Fig. 2 is a similar view of a modification.

Referring to the drawings, a regulating valve 1 is inserted in a conduit 2 and in preferred form is of a type wherein pressure in the main on the outlet side of the valve is exerted through a communicating pipe 3 on one side of a movable member or diaphragm 4 in a pressure chamber 5, against the tendency of atmosphere and weights 6 to hold the valve open, so that rise in pressure tends to close the valve and fall in pressure allows it to open. The regulating valve itself may be of any approved design.

A continuation 7 of the pipe 3 is connected with an outlet in the upper portion of a master valve casing 8 that communicates with the lower compartment of a drum 9 below a movable member or diaphragm 10 so that rise in pressure in the outlet arm of the conduit causes the diaphragm 10 to rise, and fall in pressure allows it to drop, weights 11, springs or other means being provided for insuring its downward movement when the pressure falls. A pair of inlet valve seats 12 and 13 are formed in the casing 8, and a pipe 14 from the conduit 2 on the inlet or high pressure side of the regulating valve 1 opens through an inlet into the valve casing between said inlet seats. An apertured cross-wall 15 extends across the casing below the inlet seat 13 and an upper apertured cross wall 16 is formed in the casing above the inlet seat 12. The chambers in the casing between the ends thereof and the cross walls 15 and 16 respectively, are interconnected as by a suitable passage or pipe 17. The compartment formed in the chamber by the valve seat 12 and the cross wall 16, is connected through an opening in the casing and a pipe 18 with the lower compartment of a controlling drum 19 mounted on the regulating valve 1 and divided by a movable member or diaphragm 20 connected to the stem 21 of the valve into two compartments. The compartment between the lower valve seat 13 and the cross wall 15 is connected through an opening in the casing and a pipe 22 to the upper compartment of the controlling drum 19. A stem 23 depending from the diaphragm 10 carries suitable disks or plates 24 and 25 which with the stem form a closure that is adapted to close on the valve seat 12 and the cross wall 15 when the valve stem is at the lower end of its throw and on the upper cross wall 16 and the lower seat 13 when the stem is at the upper end of its throw.

As indicated in Fig. 2, the pressure chamber and weights may be omitted from the regulating valves, and a spring 26 or other counterbalance for the closure added, leaving the regulating valve entirely under the influence of the movable diaphragm or like member in the controlling drum. The spring 26 may be provided with a hand nut 27 or the like for regulating the tension.

By this arrangement, an increase in pressure in the outlet arm of the conduit causes the diaphragm of the master valve to rise, thereby throwing the lower compartment of the controlling drum into communication with the conduit on the pressure side of the regulating valve through the upper inlet valve seat, and the upper compartment into communication with the outlet or lower pressure arm of the conduit, thus tending to close the regulating valve by lifting the diaphragm 4. When the pressure on the outlet side of the main falls, the master valve diaphragm 10 falls and shifts the connection so that the upper compartment of the controlling drum is connected with the high pressure arm of the conduit or main, and the lower compartment with the low pressure arm, and the excess pressure thereby assists the dead load or weight and the atmospheric pressure on the regulating valve to open the latter, or in the modification acts alone to open the regulator.

The modification of the regulating valve, in which the static pressure chamber and diaphragm is omitted, is adapted for use only when there is always sufficient drop in pressure or difference between the outlet and inlet pressures in the conduit to always operate the regulator. When the pressure chamber is used, if the regulating valve is open and the inlet pressure falls to the outlet pressure, and then is built up gradually, an ordinary occurrence under the usual conditions of service in gas distributing systems, the static pressure tends to gradually close the regulator until the latter establishes a drop in pressure and the pressure in the two arms of the conduit are then directed by the master valve to act differentially on the regulating valve diaphragm to open or close the regulating valve in accordance with the effect of static pressure in the main or conduit at the point where control is desired on the master valve. This differential effect or excess in pressure of one arm over that in the other is frequently referred to as "differential pressure" and the regulator may be said to be controlled by "differential pressure," and the controlling drum 19 and diaphragm 20 or equivalent moving member may be styled a differential governor. In the same way, the chamber 5 and diaphragm 4 or equivalent member may be styled a static pressure governor.

The construction of the master valve whereby both sides of the controlling drum of the regulator are in communication with one or the other arm of the main or conduit, avoids the necessity of venting the drum to the open air as in other types of governors. The form of static governor for operating the master valve may be replaced by other suitable controlling means, if preferred.

Obviously, changes in the details of construction may be made without departing from the spirit of the invention and I do not care to limit myself to any particular form or arrangement of parts.

What I claim as my invention is:—

1. In a gas generating and distributing system, a conduit, a valve adapted to automatically maintain a drop in pressure in the conduit whenever there is flow of fluid therethrough, a governor for the valve adapted to be operated by fluid admitted thereto from both a high and a low pressure point in the conduit caused by the valve, a valve controlling the admission of fluid from said two points to the governor, and means responding to changes in the drop in pressure and operating the governor valve to cause the governor and conduit valve to hold a constant outlet pressure in the conduit.

2. In a gas generating and distributing system, a conduit, a valve in the conduit, means operated by pressure of fluid in the conduit to automatically control the valve to set up a drop in pressure in the conduit whenever there is flow of fluid therethrough, a governor for the valve operated by fluid admitted thereto from both a high and a low pressure point in the conduit caused by the valve, a valve controlling the admission from said two points to the governor and means responsive to changes in the differences in pressure between said points and operating the governor valve to cause the governor and conduit valve to hold a constant outlet pressure in the conduit.

3. In a gas generating and distributing system, a conduit, a valve in the conduit, a diaphragm operating the valve in response to pressure of fluid in the conduit on the outlet side of the valve to set up a drop in pressure in the conduit whenever there is flow of fluid therethrough, means differentially operated by the pressures in the conduit on the inlet and outlet sides of the conduit valves and adapted to move the valve, a valve adapted to control the admission of fluid from the high and low pressure sides of the conduit valves to said valve moving means, and means controlled by pressures in the conduit to operate the valve of the conduit valve moving means.

4. In a gas generating and distributing system, a conduit, a valve in the conduit, a pressure chamber in communication with the conduit on the outlet side of the valve, means in the chamber operated by fluid pressure and adapted to control the conduit valve to set up a drop in pressure in the conduit whenever there is flow of fluid therethrough, a drum, a movable member dividing the drum into two compartments, adapted to act upon the conduit valve, a valve controlling the admission of fluid from the conduit on both the high and low pressure sides of the conduit valves to said drum compartments, and means responding to fluid pressure in the conduit for operating the latter valve.

5. In a gas generating and distributing system, a conduit, a regulating valve in the conduit, a pressure chamber in communication with the conduit on the outlet side of the regulating valve, a movable member in the chamber operating the regulating valve in response to fluid pressure in the conduit to set up a drop in pressure in the conduit whenever there is flow of fluid therethrough, a drum, a movable member dividing the drum into two compartments and operating the regulating valve, a master valve controlling the flow of fluid from the conduit on both the high and low pressure sides of the regulating valve to the drum compartments, and means controlling the master valve in response to fluid pressure in the conduit, and coöperating with the regulating valve to hold a constant pressure in the conduit on the outlet side of the regulating valve.

6. In a gas generating and distributing system, a conduit, a regulating valve therein, means operated by fluid pressure in the conduit and adapted to automatically move the regulating valve to set up a drop in pressure in the conduit whenever there is flow of fluid therethrough, a drum, a movable member dividing the drum into two compartments and operating the regulating valve, a master valve casing having inlets from the conduit on both the high and low pressure sides of the regulating valves, and outlets each in communication with one of the drum compartments, a single closure adapted to control and direct the flow from either inlet through the casing to either compartment, and means for operating the closure in response to pressure of fluid in the conduit.

7. In a gas generating and distributing system, a conduit, a regulating valve therein, means operated by fluid pressure in the conduit and adapted to automatically move the regulating valve to set up a drop in pressure in the conduit whenever there is flow of fluid therethrough, a drum, a movable member dividing the drum into two compartments and operating the regulating valve, a master valve casing having inlets from the conduit on both the high and low pressure sides of the regulating valve, and outlets each in communication with one of the drum compartments, a single closure adapted to control and direct the flow from either inlet through the casing to either compartment, a drum on the master valve casing, a movable member in the drum connected to the closure and adapted to form with the drum an expansible compartment that is in communication with the conduit through the valve casing.

8. In a gas generating and distributing system, a conduit a valve in the conduit, a pressure chamber, in communication with the conduit on the outlet side to the regulating valve, a diaphragm in the pressure chamber for operating the regulating valve to set up a drop in pressure in the conduit whenever there is flow of fluid therethrough, a drum, a movable member dividing the drum into two compartments and operating the regulating valve, a master valve casing, having inlets in communication respectively with the conduit on the inlet and outlet sides of the regulating valves and outlets each in communication with one of the compartments of the drum, a closure in the casing adapted when moved in one direction to restrict the flow from one inlet to one outlet and throw the other outlet into more open communication with the other inlet, and a diaphragm operated by a fluid pressure in the conduit and adapted to shift the master valve closure.

9. In a gas generating and distributing system, a conduit, a regulating valve in the conduit, means operating the valve to automatically set up a drop in pressure in a conduit whenever there is flow of fluid therethrough, a controlling drum, a movable member dividing the drum into two compartments and operating the regulating valve, a master valve casing, a pipe connecting the conduit on the high pressure side of the regulating valve with an inlet to the valve casing, pipes each connecting through openings in the casing with the compartments of the drum, a pipe connecting a pair of outlets in the casing with the conduit on the low pressure side of the regulating valve, a valve closure in the casing adapted to restrict the flow from the high pressure inlet into one of the compartment pipes and simultaneously therewith to throw the high pressure inlet into more open communication with the pipe to the other compartment, and also open communication between the restricted pipe and the outlet in communication with the low pressure side of the conduit and to restrict communication between the other pipe and the other outlet in communication with the low pressure side of the conduit, and means operated by the pressures set up in the casing and adapted to operate the closure.

10. In a gas generating and distributing system, a conduit, a regulating valve in the conduit, means operating the valve to automatically set up a drop in pressure in the conduit whenever there is flow of fluid therethrough, a control drum, a movable member dividing the drum into two compartments and operating the regulating valve, a master valve casing; a pair of apertured inlet valve seats in spaced relation in the casing, a pair of apertured cross walls each between an inlet seat and the casing end, a pipe leading from the space between one cross wall and adjacent seat to one compartment of the drum, a pipe leading from the space between the other cross wall and valve seat to the other compartment of the drum, an inlet pipe connecting the space between the inlet valve seats and the conduit on the high pressure side of the regulating valve, a pipe connecting the end space of the casing with the conduit on the low pressure side of the regulating valve, a single stem having a pair of disks adapted to simultaneously seal either cross wall and the remote valve seat, a pressure chamber above and in communication with the valve casing, and a movable member in the pressure chamber adapted to operate the stem.

11. In a gas generating and distributing system, a conduit, a regulating valve in the conduit, a controlling drum on the regulating valve, a pressure chamber on the drum in communication with the conduit on the low pressure side of the regulating valve, a movable member forming one wall of the pressure chamber and operating the regulating valve, a movable member dividing the drum into two compartments and operating the regulating valve, a master valve casing, a pair of apertured inlet valve seats in spaced relation in the casing, a pair of apertured cross walls each between an inlet seat and the casing end, a pipe leading from the space between one cross wall and adjacent seat to one compartment of the drum, a pipe leading from the space between the other cross wall and valve seat to the other compartment of the drum, an inlet pipe connecting the space between the inlet valve seats and the conduit on the high pressure side of the regulating valve, a pipe connecting the end space of the casing with the conduit on the low pressure side of the regulating valve, a single stem having a pair of disks adapted to simultaneously seal either cross wall and the remote valve seat, a pressure chamber above and in communication with the valve casing, and a movable member in the pressure chamber adapted to operate the stem.

In testimony whereof I affix my signature in presence of two witnesses.

FRANK L. CROSS.

Witnesses:
C. R. STICKNEY,
A. M. SHANNON.